US011079638B2

(12) United States Patent
Yu et al.

(10) Patent No.: US 11,079,638 B2
(45) Date of Patent: Aug. 3, 2021

(54) DISPLAY DEVICES WITH INTEGRATED TIMING CONTROLLERS

(71) Applicant: Hewlett-Packard Development Company, L.P., Spring, TX (US)

(72) Inventors: Cheng-Hua Yu, Taipei (TW); Feng-Cheng Lin, Taipei (TW); Shan-Chih Chen, Taipei (TW); Chih-Ting Lai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/982,175

(22) PCT Filed: Jun. 13, 2018

(86) PCT No.: PCT/US2018/037179
§ 371 (c)(1),
(2) Date: Sep. 18, 2020

(87) PCT Pub. No.: WO2019/240779
PCT Pub. Date: Dec. 19, 2019

(65) Prior Publication Data
US 2021/0124203 A1    Apr. 29, 2021

(51) Int. Cl.
*G02F 1/1345* (2006.01)
*G02F 1/1362* (2006.01)
*G02F 1/13357* (2006.01)
*G02F 1/1333* (2006.01)
*G02F 1/1368* (2006.01)

(52) U.S. Cl.
CPC ........ *G02F 1/13452* (2013.01); *G02F 1/1368* (2013.01); *G02F 1/13454* (2013.01); *G02F 1/133308* (2013.01); *G02F 1/133603* (2013.01); *G02F 1/136222* (2021.01); *G09G 2310/08* (2013.01)

(58) Field of Classification Search
None
See application file for complete search history.

(56) References Cited

U.S. PATENT DOCUMENTS

| 6,147,724 A | 11/2000 | Yoshiomi et al. |
| 6,166,788 A | 12/2000 | Ha et al. |
| 6,621,547 B2 | 9/2003 | Kang |
| 9,322,982 B2 | 4/2016 | Yu |
| 2006/0232579 A1* | 10/2006 | Chen .................. G09G 3/3611 345/211 |

(Continued)

FOREIGN PATENT DOCUMENTS

| CN | 101256293 | 9/2008 |
| JP | 2001083902 | 3/2001 |

(Continued)

*Primary Examiner* — Richard H Kim
(74) *Attorney, Agent, or Firm* — HPI Patent Department

(57) ABSTRACT

In one example, a display device may include a display panel having a light guide plate, a printed circuit board (PCB) to generate a driving signal to drive the display panel, a driving integrated circuit (IC) mounted on the display panel to process the driving signal, a timing controller (TCON) integrated into the driving IC to control driving of the display panel, and a flexible printed circuit to electrically connect the driving IC and the PCB. The PCB may be disposed behind the driving IC.

14 Claims, 4 Drawing Sheets

(56) References Cited

U.S. PATENT DOCUMENTS

| | | | | |
|---|---|---|---|---|
| 2008/0111950 A1* | 5/2008 | Hong | ................... | G02B 6/0085 |
| | | | | 349/65 |
| 2012/0086682 A1 | 4/2012 | Shi | | |
| 2014/0232945 A1* | 8/2014 | Uno | ........................ | H04N 5/66 |
| | | | | 348/739 |
| 2014/0307216 A1* | 10/2014 | Katayama | ......... | G02F 1/133784 |
| | | | | 349/152 |
| 2016/0260366 A1 | 9/2016 | Kim | | |
| 2019/0361294 A1* | 11/2019 | Yang | ..................... | H05K 1/189 |

FOREIGN PATENT DOCUMENTS

| | | |
|---|---|---|
| TW | 201248603 A | 12/2012 |
| TW | 201532017 A | 8/2015 |

* cited by examiner

DISPLAY DEVICES WITH INTEGRATED TIMING CONTROLLERS

BACKGROUND

With the development of information society, the demands on display devices to display images are increasing in various aspects. Accordingly, various flat panel display devices such as liquid crystal displays (LCDs), plasma display panels (PDPs), and organic light-emitting displays (OLED) are being utilized.

BRIEF DESCRIPTION OF DRAWINGS

Examples are described in the following detailed description and in reference to the drawings, in which.

DETAILED DESCRIPTION

Figure 1:
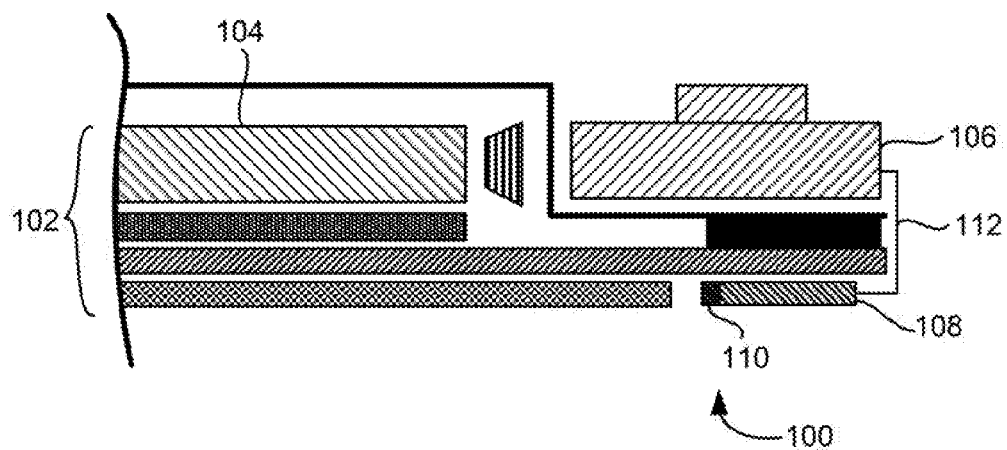
FIG. 1 is a cross-sectional side view of a portion of an example display device, depicting a printed circuit board (PCB) disposed behind a driving integrated circuit (IC)

Example display devices may include liquid crystal displays, field emission displays, plasma display panels, and organic electroluminescent displays. Example display devices may be notebook computers, tablet computers, personal digital assistants (PDAs), and mobile phones. For example, a notebook computer may include a main body (e.g., a base housing) for storing and processing information provided by an input unit such as a keyboard, and a display housing (e.g., a display device) capable of rotating about the main body for displaying the information supplied from the main body thereon.

To operate a display device, components for generating various control signals, data signals, and the like may be mounted at certain regions of a substrate of the display device. For example, the display device may include a display unit (e.g., an LCD) and a chassis. The display unit may include a display panel, a backlight assembly, and a rear cover. Further, example components for generating various control signals and data signals may include a printed circuit board (PCB) to generate a driving signal and driving ICs (e.g., gate driving ICs and, data driving ICs) mounted on, the display panel to process the driving signal. In some examples, the PCB and the driving ICs may be mounted to be separated from one another, and electrically connected by means of wirings (e.g., flexible printed circuits (FPCs)). Therefore, a significant number of the wirings may be provided on the PCB. Further, timing controllers (TCONs) may be provided on the PCB to control driving of the display panel.

In some examples, the PCB including the TCON may be disposed below the display unit, which can result in an increased size of a bottom bezel of the display device in Y-axis (i.e., an increased chin size of about 10-12 mm in Y-axis). In other examples, the PCB may be mounted to the display unit in a PCB-bending manner and bent from a side plane towards a rear plane of the display unit to be connected to the driving ICs. In such scenarios, the thickness of the display unit may be increased due to the thickness of the components mounted on the PCB. For example, bending the PCB backward beneath the display unit may induce a thickness of about 2-2.5 mm.

Examples described herein may mitigate a thickness impact and achieve a reduced Y-dimension (i.e., a reduced chin size) of a display device. Examples described herein may utilize a one-chip driving package (e.g., including TCON) along with a backlight structure and PCB design to provide a 4-side narrow display. For example, one-chip driving package may integrate data driving ICs and gate driving ICs to reduce a number of driving ICs, which in turn can save a glass dimension (i.e., a thin-film-transistor dimension). Further, integrating TCON associated with the PCB into the one-chip driving package may reduce the size of the PCB. The size of the PCB can also be reduced due to reduced source channels (i.e., a reduced number of the wirings) connecting the PCB and the one-chip driving package. In addition, the backlight structure along with a side-mount light emitting diode (LED) package may yield space for integrating the PCB in the display panel.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described may be included in at least that one example, but not necessarily in other examples.

Examples described herein may provide a display device. The display device may include a display panel having a light guide plate, a PCB to generate a driving signal, a driving IC mounted on the display panel, a TCON integrated into the driving IC, and a flexible printed circuit to electrically connect the driving IC and the PCB. In one example, the PCB may be disposed below a side surface of the light guide plate.

Referring to the figures, FIG. 1 is a cross-sectional side view of a portion of an example display device 100, depicting a PCB 106 disposed behind a driving IC 108. Example display device 100 may include a liquid crystal display, a field emission display, a plasma display panel, an organic electroluminescent display, or the like. Example display device 100 may be a display unit associated with a notebook computer, a tablet computer, a personal digital assistant (PDA), a convertible device, or the like.

As shown in FIG. display device 100 may include a display panel 102 having a light guide plate 104 to guide light from light sources to display panel 102. Light guide plate 104 may uniformly supply light emitted from the light sources. Further, display device 100 may include PCB 106 to generate a driving signal to drive display panel 102. Display panel 102 may also include other components such as the light sources, display layers, and the like. Example light source may be a side-mount light emitting diode (LED) package.

Furthermore, display device 100 may include driving IC 108 mounted on display panel 102 to process the driving signal. In one example, PCB 106 may supply the driving signal to driving IC 108 and driving IC 108 may supply the driving signal to display panel 102. In one example, driving IC 108 may be a one-chip driving package integrating gate driving ICs and data, driving ICs. For example, the gate driving ICs and the data driving ICs may supply a gate driving signal and a data driving signal to a gate line and a data line of display panel 102. Integrating the gate driving ICs and the data driving ICs into the one-chip driving package may reduce the number of source channels connecting PCB 106 and driving IC 108.

Also, display device 100 may include a TCON 110 integrated into driving IC 108 to control driving of display panel 102. In some examples, TCON 110 may be integrated into driving IC 108 to reduce a size of PCB 106. In other examples, multiple ICONS associated with PCB 106 can be integrated into driving IC 108 to reduce the size of PCB 106. For example, ICON 110 may generate various control signals for driving display device 100 based on driving data. That is, TCON 110 may generate a driving control signal depending on the information associated with a driving program of display device 100, driving timing of display device 100, and the like.

Figure 3A:
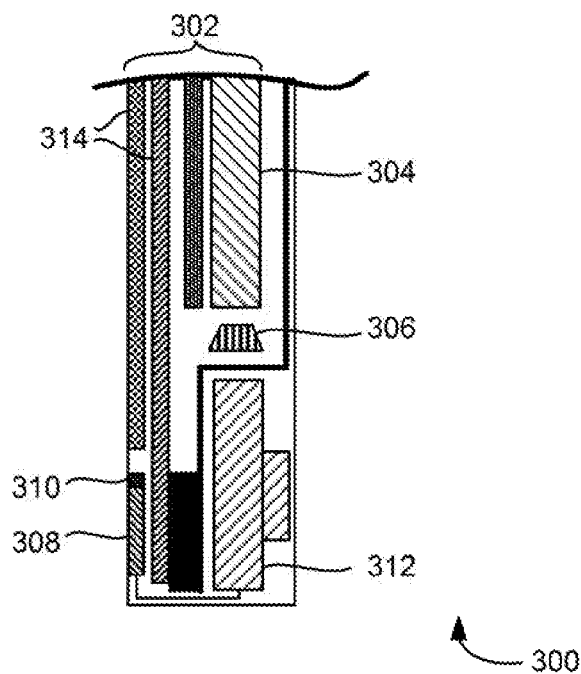
FIG. 3A is a cross-sectional side view of a portion of an example display device, depicting a PCB disposed below a side surface of a light guide plate and behind a driving IC.

Further, display device 100 may include a flexible printed circuit 112 to electrically connect driving IC 108 and PCB 106. PCB 106 can be disposed behind driving IC 108. In one example, PCB 106 may be bent to a rear plane of display panel 102 below a side surface of light guide plate 104 (e.g., when display device 100 is in a vertical position as shown in FIG. 3A) and behind driving IC 108 via flexible printed circuit 112. In one example, PCB 106 may be disposed towards the side surface of light guide plate 104 such that PCB 106 and light guide plate 104 may be in the same plane and parallel to each other. For example, one end of flexible printed circuit 112 which is connected to driving IC 108 and a second end of flexible printed circuit 112 which is connected to PCB 106 may be spaced from each other in a thickness direction of display panel 102.

Figure 2:
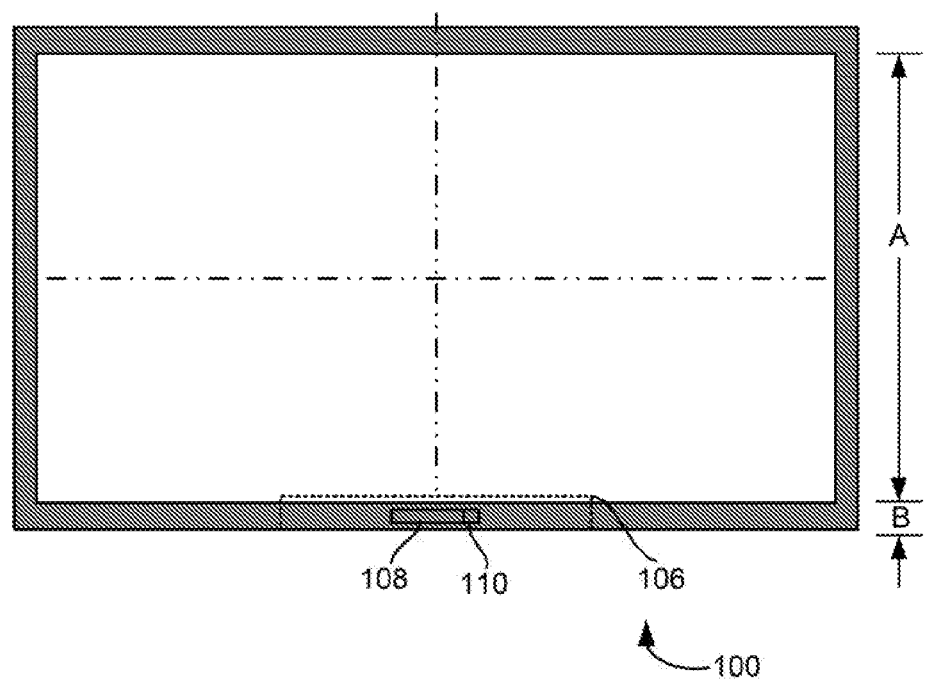
FIG. 2 is a perspective view of the example display device of FIG. 1, depicting the PCB disposed behind the driving IC.

FIG. 2 is a perspective view of example display device 100 of FIG. 1, depicting PCB 106 disposed behind driving IC 108. As shown in FIG. 2, display device 100 may include a display area A and a non-display area B Driving IC 108 including ICON 110 may be disposed in a front plane of display panel 102 in non-display area B. Further, PCB 106 may be disposed in a rear plane of display panel 102 in non-display area B behind driving IC 108. As the size of PCB 106 is reduced and disposed below a side surface of light guide plate (e.g., light guide plate 104 of FIG. 1) and behind driving IC 108, a width of non-display region B can be reduced while mitigating the thickness impact. In this case, a width of a bezel may be substantially same as a width of the non-display area B. As a result, display device 100 having a relatively narrow bezel can be provided.

FIG. 3A is a cross-sectional side view of a portion of an example display device 300, depicting a PCB 312 disposed below a side surface of a light guide plate 304 and behind a driving IC 308. Display device 300 may include a display panel 302. Display panel 302 may include light guide plate 304 and a side-mount light source 306 to emit light towards a side surface of light guide plate 304. Display panel 302 may have a rectangular plate shape including two pairs of sides. In one example, display panel 302 may have a rectangular shape including a pair of long sides and a pair of short sides.

Further, display device 300 may include driving IC 308 mounted on display panel 302. Furthermore, display device 300 may include a TCON 310 integrated into driving IC 308. Driving IC 308 is a one-chip driving package integrating gate driving ICs, and data driving ICs.

Furthermore, display device 300 may include PCB 312 connected to driving IC 308. In one example, PCB 312 may be disposed below the side surface of light, guide plate 304 and behind driving IC 308 (e.g., towards a long side of display panel 302). In one example, PCB 312 may be disposed below the side surface of light guide plate 304 and behind driving IC 308 by bending PCB 312. For example, PCB 312 may include a base substrate, which can be a flexible substrate made of plastic, such as polyimide or polyester. In one example, driving IC 308 and PCB 312 may be coupled with one another via a flexible printed circuit. In another example, driving IC 308 and PCB 312 may be directly coupled with one another without the flexible printed circuit. In this example, PCB 312 can be a flexible PCB.

In addition, display device 300 may include display layers 314 to cover display panel 302. Example display layers 314 may include any combination of a liquid crystal display layer, a thin-film-transistor layer, a color filter layer, and the like. For example, liquid crystal display layer may be formed between the thin-film-transistor layer and the color filter layer to vary a permeability of light by a change in an arrangement by means of an electric field.

Figure 3B:
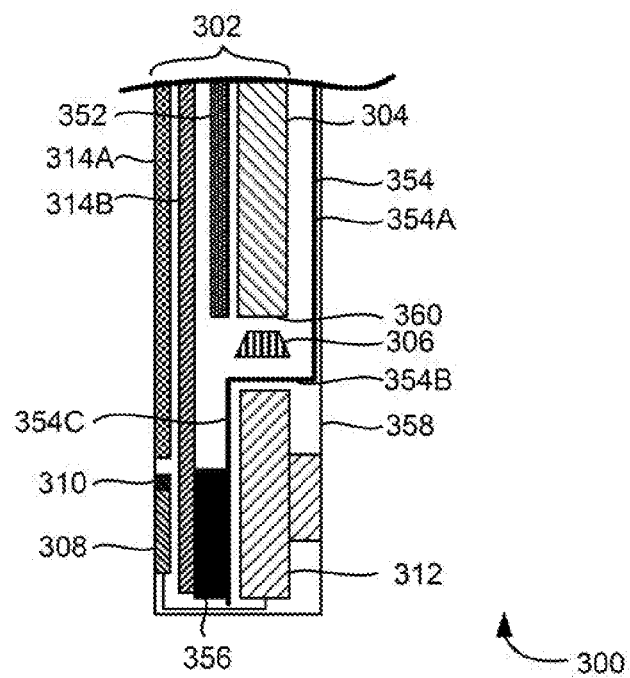
FIG. 3B is a cross-sectional side view of the portion of the example display device of FIG. 3A, depicting additional features.

FIG. 3B is a cross-sectional side view of the portion of example display device 300 of FIG. 3A, depicting additional features. For example, similarly named elements of FIG. 3B may be similar in structure and/or function to elements described with respect to FIG. 3A.

As shown in FIG. 38, display panel 302 may include an optical film 352 disposed between display layers 314 and light guide plate 304. Display layers 314 may include a thin-film-transistor layer 314B and a color filter layer 314A that are combined with each other while facing each other. In some examples, light guide plate 304 may include a surface from which a backlight illumination is provided to display layers 314. Gate driving ICs and data driving ICs may supply a gate driving signal and a data driving signal to a gate line and a data line of thin-film-transistor layer 314B.

Further, display panel 302 may include a rear cover 354 to house light guide plate 304, optical film 352, and display layers 314 therein. In one example, rear cover 354 may include a first portion 354A, a second portion 354B perpendicular to first portion 354A, and a third portion 354C perpendicular to second portion 354B in a direction away from first portion 354A. In one example, PCB 312 may be mounted on display panel 302 below a side surface 360 of light guide plate 304 with second portion 354B in-between. As shown in FIG. 3B, PCB 312 may be disposed at a rear side of third portion 354C.

Furthermore, a front side of third portion 354C may be attached to thin-film-transistor layer 314B using a bonding material 356, such as an adhesive. Also, display device 300 may include a chassis 358 to accommodate display panel 302, side-mount light source 306, PCB 312, and the like.

Figure 3C:
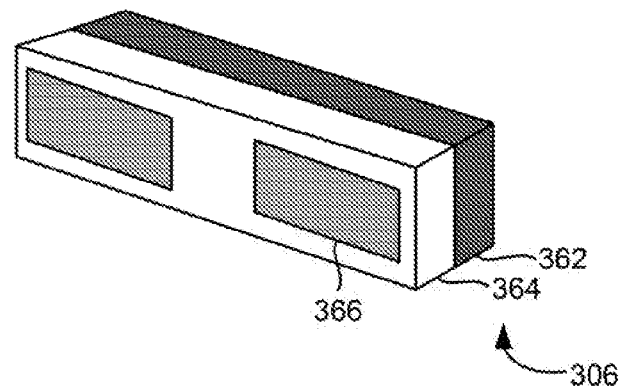
FIG. 3C is a schematic diagram of an example side-mount light source.

FIG. 3C is a schematic diagram of an example side-mount light source 306. Side-mount light source 306 may include a base 362, a flexible printed circuit (FPC) bar 364, a light emitting diode (LED) package 366 provided on FPC bar 364. In one example, a side-mounting surface of LED package 366 may be secured to base 362 via a bonding material to create space for mounting PCB (e.g., PCB 312) in display panel (e.g., display panel 302). In some examples, LED package 366 may be parallel to display panel 302 and disposed at one side of second portion 354B to emit light towards side surface 360 of light guide plate 304.

Figure 4A:
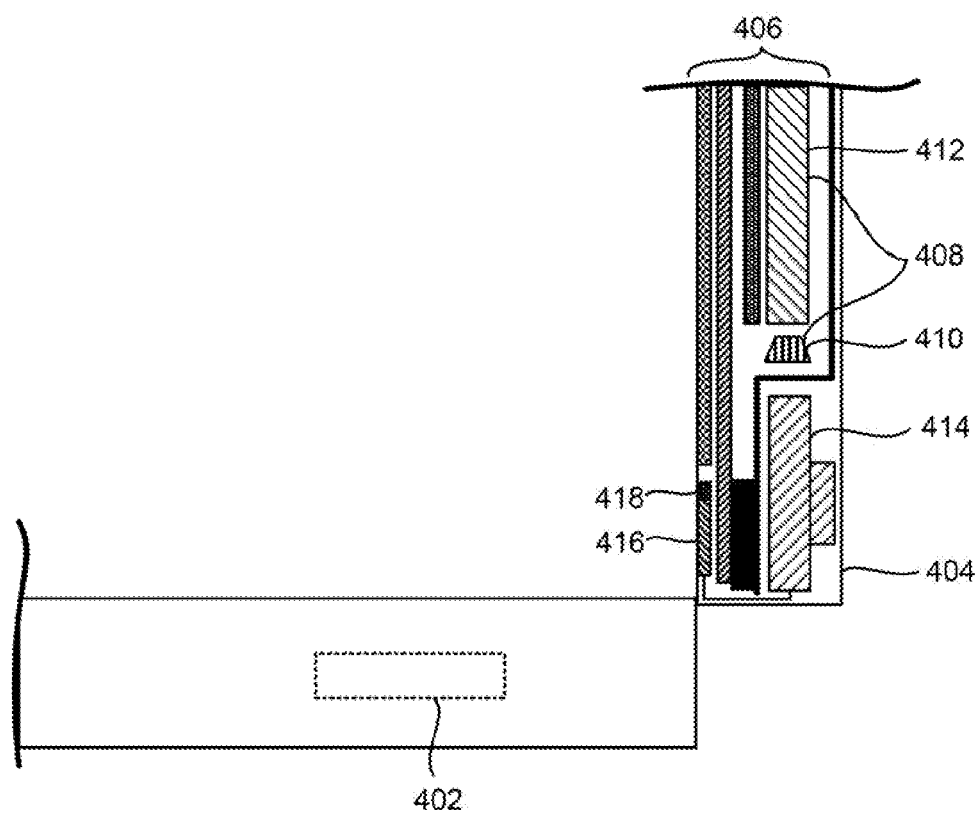
FIG. 4A is a cross-sectional side view of a portion of an example electronic device, depicting a PCB mounted on a display panel behind a driving IC and below a side surface of a light guide plate.

FIG. 4A is a cross-sectional side view of a portion of an example electronic device 400, depicting a PCB 414 mounted on a display panel 406 behind a driving IC 416 and below a side surface of a light guide plate 412. Electronic device 400 may include a processor 402 to generate image data and a display unit 404 communicatively coupled to processor 402 to receive the image data and display an image. Processor 402 may be, provided as a part of display unit 404 or a base housing. Example processor 402 may include microprocessors, microcomputers, microcontrollers, digital signal processors, central processing units, state machines, logic circuitries, and/or any other devices that manipulate signals and data based on computer-readable instructions.

Display unit 404 may include a display panel 406 to receive light and display an image. Display panel 406 may include a backlight assembly 408. Backlight, assembly 408 may provide light to display panel 406. For example, backlight assembly 408 may include a side-mount LED module 410 to generate the light. Backlight assembly 408 may also include light guide plate 412 to receive the light and display the image. In some examples, side-mount LED module 410 may be disposed below a side surface of light guide plate 412.

Display unit 404 may include PCB 414 to generate a driving signal to drive display panel 406. Also, display unit 404 may include driving IC 416 mounted on display panel 406 to process the driving signal. In one example, driving IC 416 may include multiple ICs integrated therein. In addition, display unit 404 may include a TCON 418 integrated into driving IC 416 to control driving of display panel 406. In one example, PCB 414 may be mounted, on display panel 406 below the side surface of light guide plate 412 and side-mount LED module 410.

Figure 4B:
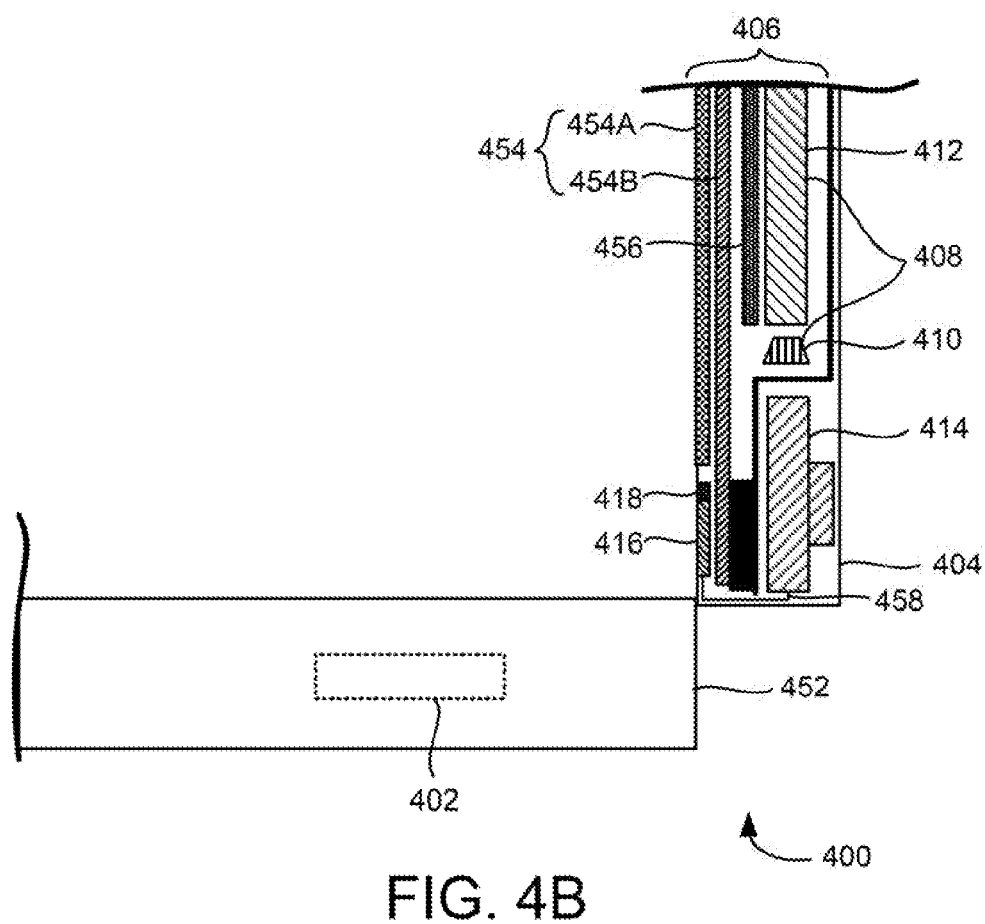
FIG. 4B is a cross-sectional side view of the portion of the exam pie electronic device of FIG. 4A, depicting additional features.

FIG. 4B is a cross-sectional side view of the portion of example electronic device 400 of FIG. 4A, depicting additional features. For example, similarly named elements of FIG. 48 may be similar in structure and/or function to elements described with respect to FIG. 4A. As shown in FIG. 48, example electronic device 400 may include display unit 404 and a base housing 452 pivotally connected to display unit 404, for instance, via a hinge assembly. Display unit 404 can be rotated between a closed position and an open position.

Example electronic device 400 may be a computing system, for example, a laptop, a convertible device, a PDA, a notebook, a sub-notebook, a personal gaming device, or other computing device with a display unit 404 closeable onto base housing 452. Example convertible device may refer to a device that can be "converted" from a laptop mode to a tablet mode. In the tablet mode, display unit 404 may be closed with a display facing up and viewable, i.e., display unit 404 may be substantially parallel to and adjacent to base housing 452 with the display viewable.

For example, base housing 452 may house processor 402. In other examples, base housing 452 may house a keyboard, a battery, a touchpad, and so on. Display unit 404 may house display panel 406 (e.g., a touch-screen display). Example display panel 406 may include an LCD, LED, electroluminescent (EL) display, or the like. Electronic device 400 may be equipped with other components such as a camera, audio/video devices, and the like, depending on the functions of electronic device 400. The hinge assembly may be pivotally connected to display unit 404 and base housing 452 along a single-axis or a double-axes.

Display unit 404 may include a flexible printed circuit 458 including wirings to electrically connect driving IC 416 and PCB 414. As shown in FIG. 4B, PCB 414 may be connected to driving IC 416 and bent to a rear plane of display panel 406 below the side surface of light guide plate 412 via flexible printed circuit 458 (e.g., towards a bottom long side of the display panel).

In some examples, side-mount LED module 410 may be parallel to display panel 406 and disposed at a side of a rear cover (e.g., on one side of second portion 354B of FIG. 3B) below the side surface of light guide plate 412. For example, side-mount LED module 410 may include a base, an FPC bar, LEDs provided on the FPC bar, and a bonding material to secure a side-mounting surface of the LEDs to the base. In some examples, side-mount LED module 410 may provide space for mounting PCB 414 in display panel 406.

Display panel 406 may include display layers 454 including a thin-film-transistor layer 454B and a color filter layer 454A to cover a display area (e.g., having a plurality of pixels on thin-film-transistor layer 454B) and a non-display area of display panel 406. In some examples, thin-film-transistor layer 454B and color filter layer 454A may cover a portion of the non-display area of display panel 406. Further, driving IC 416 and PCB 414 may be disposed in the non-display area. Furthermore, display panel 406 may include an optical film 456 disposed between display layers 454 and light guide plate 412. Also, driving IC 416 may be mounted on a metal pad installed at one lateral side of thin-film-transistor layer 44, in which the metal pad is connected with metal intercom ions between gate lines and data lines of thin-film-transistor layer 454B.

In other examples, display panel 406 may include thin-film-transistor layer 454B and color filter layer 454A that are combined with each other while facing each other. Further, backlight assembly 408 may be disposed behind display panel 406 and provide light to display panel 406. In some examples, thin-film-transistor layer 454B and color filter layer 454A can have liquid crystals interposed therebetween, in which the liquid crystals adjust light transmittance.

Thus, exam les described herein may utilize a one-chip solution that can integrate a ICON associated with a PCB to reduce an area occupied by the PCB along with a backlight structure that can create a space to assemble the PCB (i.e., having a reduced size) to mitigate the thickness impact and to achieve shorter V-dimension (e.g., smaller chin) of the display device (i.e., the display panel can become thinner and lighter).

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise"

or appropriate variation thereof. Furthermore, the term "based on," as used herein, means "based at least in part on," Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A display device comprising:
   a display panel having a light guide plate;
   a printed circuit board (PCB) to generate a driving signal to drive the display panel;
   a driving integrated circuit (IC) mounted on the display panel to process the driving signal;
   a timing controller (TCON) integrated into the driving IC to control driving of the display panel;
   a flexible printed circuit to electrically connect the driving IC and the PCB, wherein the PCB is disposed behind the driving IC; and
   a rear cover to house the light guide plate therein, wherein the rear cover includes a first portion, a second portion perpendicular to the first portion, and a third portion perpendicular to the second portion in a direction away from the first portion, and wherein the PCB is mounted on the display panel below a side surface of the light guide plate with the second portion in-between.

2. The display device of claim 1, wherein the PCB is bent to a rear plane of the display panel below a side surface of the light guide plate and behind the driving IC via the flexible printed circuit.

3. The display device of claim 1, wherein the driving IC is a one-chip driving package integrating gate driving ICs and data driving ICs.

4. The display device of claim 1, wherein the display panel further comprises:
   a light source disposed along a side surface of the light guide plate, wherein the light source comprises a side-mount light emitting diode (LED) package.

5. A display device comprising:
   a display panel comprising:
      a light guide plate;
      a side-mount light source to emit light towards a side surface of the light guide plate; and
      display layers to cover the display panel;
   a driving integrated circuit (IC) mounted on the display panel;
   a timing controller (TCON) integrated into the driving IC;
   a printed circuit board (PCB) connected to the driving IC, wherein the PCB is disposed below the side surface of the light guide plate and behind the driving IC; and
   a rear cover to house the light guide plate therein, wherein the rear cover includes a first portion, a second portion perpendicular to the first portion, and a third portion perpendicular to the second portion in a direction away from the first portion, and wherein the PCB is mounted on the display panel below the side surface of the light guide plate with the second portion in-between.

6. The display device of claim 5, wherein the PCB is disposed below the side surface of the light guide plate and behind the driving IC by bending the PCB.

7. The display device of claim 5, wherein the driving IC is a one-chip driving package integrating gate driving ICs and data driving ICs.

8. The display device of claim 5, wherein the display panel comprises:
   an optical film disposed between the display layers and the light guide plate, wherein the display layers include a thin-film-transistor layer and a color filter layer, and wherein the light guide plate comprises a surface from which a backlight illumination is provided to the display layers.

9. The display device of claim 5, wherein the side-mount light source comprises:
   a base;
   a flexible printed circuit (FPC) bar;
   a light emitting diode (LED) package provided on the FPC bar; and
   a bonding material to secure a side-mounting surface of the LED package to the base.

10. An electronic device comprising:
    a processor to generate image data; and
    a display unit, communicatively coupled to the processor, to receive the image data and display an image, wherein the display unit comprises:
       a display panel including a backlight assembly, wherein the backlight assembly comprises:
          a side-mount light emitting diode (LED) module to generate light; and
          a light guide plate to receive the light and display the image;
       a printed circuit board (PCB) to generate a driving signal to drive the display panel;
       a driving integrated circuit (IC) mounted on the display panel to process the driving signal, wherein the driving IC includes multiple ICs integrated therein;
       a timing controller (TCON) integrated into the driving IC to control driving of the display panel; and
       a rear cover to house the light guide plate therein, wherein the rear cover includes a first portion, a second portion perpendicular to the first portion, and a third portion perpendicular to the second portion in a direction away from the first portion, and wherein the PCB is mounted on the display panel below a side surface of the light guide plate with the second portion in-between.

11. The electronic device of claim 10, further comprising:
    a flexible printed circuit including wirings to electrically connect the driving IC and the PCB.

12. The electronic device of claim 11, wherein the PCB is connected to the driving IC and bent to a rear plane of the display panel below the side surface of the light guide plate via the flexible printed circuit.

13. The electronic device of claim 10, wherein the side-mount LED module comprises:
    a base;
    a flexible printed circuit (FPC) bar;
    a LED package provided on the FPC bar; and
    a bonding material to secure a side-mounting surface of the LED package to the base.

14. The electronic device of claim 10, wherein the display panel comprises:
    display layers including a thin-film-transistor layer and a color filter layer to cover a display area and a non-display area of the display panel, wherein the driving IC and the PCB are disposed in the non-display area; and
    an optical film disposed between the display layers and the light guide plate.

* * * * *